May 8, 1962  E. R. BROWN  3,033,709
PRINTING BLANKETS
Filed Nov. 5, 1959
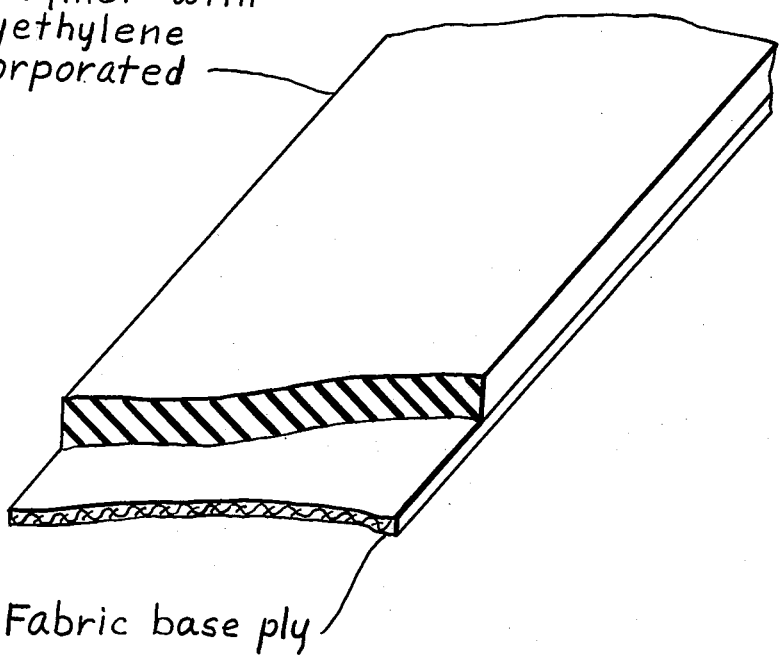
INVENTOR.
ERNEST R. BROWN
BY
Reuben Wolk
ATTORNEY

United States Patent Office 3,033,709
Patented May 8, 1962

3,033,709
PRINTING BLANKETS
Ernest R. Brown, Waynesville, N.C., assignor to Dayco Corporation, a corporation of Ohio
Filed Nov. 5, 1959, Ser. No. 850,997
1 Claim. (Cl. 117—161)

This invention relates to printing blankets used in the printing art.

Printing blankets are utilized in lithography for the purpose of transferring the image from the printing plate to the paper. These blankets are the subject of careful design because of the importance of transferring every detail perfectly. These blankets are usually made of elastomeric materials or have such materials in their ink-receiving surface. One such elastomeric material which is commonly utilized is the oil and ink-resistant synthetic rubber-like material obtained by the copolymerization of butadiene and acrylic nitrile. Such polymers are generally known as Buna-N, Hycar, Butaprene, Paracril, etc., and are generally made in a variety of types ranging from a low of approximately 10% combined acrylonitrile to a high of approximately 40% combined acrylonitrile.

Among the many desirable properties of these blankets is ease of release of the blanket from the surfaces which it contacts during operation. In the conventional blanket, this is a serious problem and applicant has solved the problem by the use of special compounds which he has developed. These compounds, which are used in the face or ink-receiving surface, contain a minor proportion of polyethylene. It has been found that the addition of from 2.5 to 5 parts of polyethylene powder based on 100 parts of the polymer by weight, and compounded with other conventional compounding materials such as antioxidants, accelerators, fillers and the like, greatly improve the releasing properties of the blanket.

It is a primary object of this invention, therefore, to provide a printing blanket surface having good release properties.

This and other objects will be more clearly understood in the following description. As shown in the drawing, which is an isometric view in partial section, the printing blanket itself is usually made of a laminated structure having an impregnated fabric base ply and a face ply or surface layer of rubber composition. The face or surface of the blanket is the only ply involved in the present invention, and the remaining structure will not be described herein. Suffice to say that the blanket might be similar to the one described in U.S. Patent No. 2,065,442, issued December 22, 1936, of common assignment. A typical composition of which the face ply is made in accordance with the present invention is as follows:

| | Parts by weight |
|---|---|
| Acrylonitrile-butadiene copolymer (26% acrylonitrile content) | 100.00 |
| Zinc oxide | 5.00 |
| Diphenylguanidine (accelerator) | 0.25 |
| Phenylbetanaphthylamine (antioxidant) | 2.00 |
| Benzothiazole difulfide (accelerator) | 1.00 |
| Thermatomic carbon (filler) | 40.00 |
| Brown factice (softener) | 20.00 |
| Sulfur | 2.50 |
| Stearic acid | 1.00 |
| Di(butoxy ethoxy ethyl)formal (plasticizer) | 15.00 |
| Polyethylene powder (molecular weight 1500–2000) | 2.50 to 5.00 |

The above composition is thoroughly mixed on a mill and calendered onto the fabric as more completely described in the above-referenced Patent No. 2,065,442.

Modifications in the above composition may be made without departing from the basic concept of the invention; namely, the compounding of polyethylene powder into a printing blanket surface layer. Such changes might involve different accelerators, plasticizers, fillers, or antioxidants.

I claim:

A laminated printing blanket having an impregnated fabric base ply and a surface layer comprising a butadiene-acrylic nitrile copolymer having a 10 to 40 percent acrylonitrile content, said layer having incorporated therein 2.5 to 5 parts of polyethylene per 100 parts of copolymer by weight.

References Cited in the file of this patent

UNITED STATES PATENTS

| 2,271,125 | Juve | Jan. 27, 1942 |
| 2,383,839 | Beekley | Aug. 28, 1945 |
| 2,561,063 | McBurney et al. | July 17, 1951 |
| 2,711,985 | Olson | June 28, 1955 |